United States Patent Office 3,214,425
Patented Oct. 26, 1965

3,214,425
PROCESS FOR THE PREPARATION OF RIBOFLA-
VIN AND THE 2-IMINO-2'-HYDROXYETHYL
DERIVATIVE THEREOF
Thomas Rowan, Glasgow, and Hamish C. S. Wood,
Bearsden, Glasgow, Scotland, assignors to Burroughs
Wellcome & Co. (U.S.A.) Inc., Tuckahoe, N.Y., a cor-
poration of New York
No Drawing. Filed Dec. 18, 1963, Ser. No. 331,352
Claims priority, application Great Britain, Dec. 20, 1962,
48,257/62
4 Claims. (Cl. 260—211.3)

The present invention relates to a new process for the synthesis of riboflavin and related compounds.

It is known that in the biochemical synthesis of ribo-flavin 6,7-dimethyl-8-ribityllumazine acts as a precursor. It has now surprisingly been found that 6,7-dimethyl-8-ribityllumazine, and related compounds, can be simply converted by chemical means to riboflavin and related compounds respectively.

Accordingly the present invention is for the synthesis of compounds of the formula:

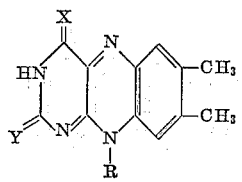

which comprises heating, preferably under reflux and under an inert atmosphere, a neutral aqueous solution of a compound of the formula:

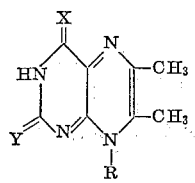

where in the above formulae X and Y are the same or different and each is an oxygen or sulphur atom or an imino, alkylimino, aralkylimino or arylimino radical and R is an alkyl, substituted alkyl (for example hydroxy-substituted alkyl), aralkyl or aryl radical.

According to a preferred feature of the invention X and Y are both =O, or X is =O and Y is =NH, and R¹ is hydroxyethyl (—CH₂.CH₂OH) or D-ribityl (—CH₂.[CHOH]₃.CH₂OH)

According to a further preferred embodiment, the invention is for a process for the synthesis of riboflavin which comprises heating, preferably under reflux and under an inert atmosphere, a neutral aqueous solution of 6,7-dimethyl-8-ribityllumazine.

In carrying out the process of the present invention, the heating step generally requires to be continued for a long time, for example 15-20 hours. The presence of an inert atmosphere is necessary to prevent intermediate oxidation, and the heating step is suitably carried out under an atmosphere of nitrogen or under vacuum. The heating step is also preferably carried out in the dark, but this is generally the case with industrial processes.

The aqueous solution of the starting material is suitably buffered to pH 7-7.5. According to a preferred feature of the present invention the reaction is carried out using a phosphate buffer and with the solution at pH 7.3.

The presence of multivalent metallic cations accelerates the reaction, particularly in the case of the conversion of 6,7-dimethyl-8-ribityllumazine to riboflavin. The cations may comprise for example cations of transition metals such as nickel, which may be added in the form of a salt or compounds.

The new process of the present invention leads to the formation of certain new compounds having interesting biological activity as analogues of riboflavin, and these are included per se within the scope of the present invention. Thus the present invention is for the new compounds of the formula:

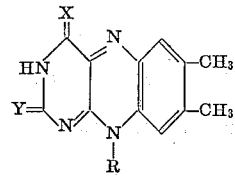

wherein in the above formula the groups, X, Y and R have the significance indicated above, but excluding the cases where X and Y are =O, and R is hydroxyethyl or D-ribityl.

The following examples are given to illustrate the present invention.

EXAMPLE 1

Synthesis of 9-2'-hydroxyethyl-6,7-dimethylisoalloxazine 8-2'-hydroxyethyl-6,7-dimethyllumazine (1 g.) was dissolved in phosphate buffer pH 7.3 (50 ml.) and the solution was refluxed in an atmosphere of oxygen-free nitrogen in the dark for 15 hours. Pale brown crystals separated and were collected (250 mg.; 41%). These were recrystallised from water (about 300 ml.) to give orange prisms (185 mg.; 30%), M.P. 299–300° C. The product was identical in RF (6 solvent systems), in melting point, and in ultraviolet and infrared spectra with an authentic sample of 9-2'-hydroxyethyl-6,7-dimethylisoalloxazine.

8-2'-hydroxyethyl-6,7-dimethyllumazine (100 mg.) was refluxed in the dark under oxygen-free nitrogen for 20 hours in formate buffer pH 7.3 (15 ml.). An identical product was obtained, the yield of pure 9-2'-hydroxyethyl-6,7-dimethylisoalloxazine being 17 mg. (28%).

8-2'-hydroxyethyl-6,7-dimethyllumazine (1 g.) was dissolved in borate buffer pH 7.3 (50 ml.) and refluxed in the dark for 15 hours under oxygen-free nitrogen yielding brown crystals (260 mg.) which on recrystallisation from water gave 9-2'-hydroxyethyl-6,7-dimethylisoalloxazine as orange crystals (190 mg.; 31%), M.P. 298–300° C.

A solution of 8-2'-hydroxyethyl-6,7-dimethyllumazine (1 g.) in phosphate buffer pH 7.3 (30 ml.) was treated with a solution of nickel sulphate (325 mg.) in phosphate buffer pH 7.3 (30 ml.). The mixture was refluxed under nitrogen in the dark for 12 hours by which time the starting material had completely reacted. On cooling, a brown solid (617 mg.) separated. Recrystallisation twice from water yielded 9-2'-hydroxyethyl-6,7-dimethylisoalloxazine as orange crystals (210 mg.; 35%), M.P. 299–301° C.

EXAMPLE 2

Synthesis of riboflavin 6,7-dimethyl-8-D-ribityllumazine (1 g.) was dissolved in phosphate buffer pH 7.3 (50 ml.) and the solution was boiled under reflux for 15 hours under oxygen-free nitrogen in the dark. The resulting brown precipitate was collected (318 mg.; 55%) and twice recrystallised from water (approximately 300 ml.) to give orange crystals (220 mg.; 38%), M.P. 290° C. The product was identical in RF (6 solvent systems), in melting point, and in ultraviolet and infrared spectra with an authentic sample of riboflavin (6,7-dimethyl-9-D-ribityl-isoalloxazine).

EXAMPLE 3

*Synthesis of 2,10-dihydro-4-hydroxy-10-2'-hydroxyethyl-2-imino-7,8-dimethylbenzo[g]pteridine*

2-amino-4-chloro-6-hydroxypyrimidine (5 g.) was dissolved in concentrated sulphuric acid (6 ml.), at less than 45° C., and fuming nitric acid (d., 1.5; 5.3 ml.) was cautiously added with stirring and cooling in an ice bath. After 30 minutes the mixture was poured on to ice (approximately 20 g.) with rapid manual stirring. The precipitated product was collected, washed quickly with ice-cold water (2 x 20 ml.), with ethanol (20 ml.) and finally with ether. The resulting yellow powder, 2-amino-4-chloro-6-hydroxy-5-nitropyrimidine (4.5 g.), melting point above 360° C., was stored under vacuum over phosphorus pentoxide. Ultraviolet absorption maximum: 300 m$\mu$ ($\epsilon$=8600) at pH 1. [Found: C, 23.25; H, 2.3; N, 26.5%. $C_4H_3N_4O_3Cl.H_2O$ requires, C, 23.0; H, 2.4; N, 26.85%.

2 - amino-4-chloro-6-hydroxy-5-nitropyrimidine (9.25 g.) was suspended in ethanol (400 ml.), and redistilled ethanolamine (6 ml.) in ethanol (100 ml.) was added. The mixture was refluxed with stirring for 20 minutes. On cooling, the crude product was filtered and washed with ethanol and ether. Crystallisation from water (2000 ml.) (with charcoal) yielded lustrous plates of 2-amino-6-hydroxy-4-2'-hydroxyethylamino - 5 - nitropyrimidine (8.4 g.; 80%), M.P. 296–297° C. Ultraviolet absorption maxima: 219 m$\mu$ ($\epsilon$=15500) and 336 m$\mu$ ($\epsilon$=11500) at pH 1; 217 m$\mu$ ($\epsilon$=12400) and 348 m$\mu$ ($\epsilon$=12600) at pH 13. [Found: C, 33.2; H, 4.0; N, 32.3%. $C_6H_9N_5O_4$ requires: C, 33.5; H, 4.2; N, 32.6%]

2 - amino - 6 - hydroxy-4-2'-hydroxyethylamino - 5 - nitropyrimidine (7.67 g.) was suspended in water (100 ml.) and 2 N sodium hydroxide was added dropwise until the solid was dissolved. The solution was hydrogenated over Raney nickel until the uptake of hydrogen was complete and was then filtered into a solution of concentrated hydrochloric acid (30 ml.) in water (30 ml.). The filtrate was immediately concentrated under vacuum to approximately 20 ml. when white crystals separated. Recrystallisation by rapid dissolution in methanol and refrigeration yielded white crystals of 2,5-diamino - 6 - hydroxy-4-2'-hydroxyethylaminopyrimidine hydrochloride (7 g.; 89%), M.P. 217–220° C. This product should be used soon after its preparation as it turns pink (probably due to oxidative self-condensation) on standing. It may be stored over phosphorus pentoxide in vacuo for a few days. Ultraviolet absorption maxima: 272 m$\mu$ ($\epsilon$=17800) at pH 1; 281 m$\mu$ ($\epsilon$=13200) at pH 13. [Found: C, 32.65; H, 5.7; N, 31.2; Cl, 16.5%. $C_6H_{11}N_5O_2.HCl$ requires: C, 32.5; H, 5.5; N, 31.6; Cl, 16.0%.]

2,5 - diamino - 6 - hydroxy-4-2'-hydroxyethylaminopyrimidine hydrochloride (2.6 g.) was suspended in methanol (100 ml.) and a solution of butane-2,3-dione (2.6 ml.) in methanol (20 ml.) was added. The mixture was refluxed for 30 minutes and after cooling was filtered to yield yellow crystals of 2,8-dihydro-4-hydroxy-8-2'-hydroxyethyl-2-imino-6,7 - dimethylpteridine hydrochloride, which were recrystallised from 2 N hydrochloric acid (yield 2.4 g.; 75%), M.P. 285–288° C. (decomp.). Ultraviolet absorption maxima: 256 m$\mu$ ($\epsilon$=15000), 287 m$\mu$ ($\epsilon$=13600) and 400 m$\mu$ ($\epsilon$=13600) at pH 1; 230 m$\mu$ ($\epsilon$=22300), 286 m$\mu$ shoulder ($\epsilon$=9750), 310 m$\mu$ ($\epsilon$=13750) and 372 m$\mu$ ($\epsilon$=3500) at pH 13. [Found: C, 44.7; H, 5, 5.4; Cl, 13.0; N, 26.2%. $C_{10}N_{13}N_5O_2.HCl$ requires: C, 44.2; H, 5.2; Cl, 13.0; N, 25.8%.]

2,8 - dihydro - 4 - hydroxy-8-2'-hydroxyethyl-2-imino-6,7-dimethylpteridine hydrochloride (1 g.) was dissolved in phosphate buffer pH 7.3 (25 ml.) and was refluxed in the dark under oxygen-free nitrogen for 24 hours. At intervals of 6 hours any solid product which had formed was removed by filtration in a hood under nitrogen. The resulting brown crystals (380 mg.; 72%) were combined and recrystallised by dissolving in 0.5 N hydrochloric acid (15 ml.), treating with charcoal, and adding sodium bicarbonate to the hot filtrate to pH 7. The product 2,10-dihydro-4-hydroxy-10-2'-hydroxyethyl-2-imino-7,8-dimethylbenzo[g]pteridine (260 mg.: 49%) was identical in Rf (6 solvent systems) with samples prepared as described in the following two paragraphs.

2 - amino-6-hydroxy-4-2'-hydroxyethylamino-5 - nitropyrimidine (500 mg.) was dissolved in a mixture of water (10 ml.) and 2 N sodium hydroxide solution (3 ml.) and reduced by sodium dithionite. The resultant solution was taken to pH 4 by addition of 2 N hydrochloric acid and treated with butane-2,3-dione dimer [5-acetyl-2,3,4,5-tetrahydro-2-hydroxy - 2,5 - dimethyl-3-oxofuran] (500 mg.) in water (5 ml.). Heating at 90° C. for 15 minutes gave an orange solution, which was adjusted to pH 1 with concentrated hydrochloric acid and refluxed in the dark for 30 minutes. Solid sodium bicarbonate was carefully added to give pH 7 and the mixture was cooled in the refrigerator. A yellow-brown solid (145 mg.) resulted which was shown by paper chromatography to contain two components. These were separated by large-scale paper chromatography (solvent system n-butanol/5 N acetic acid 7:3) on Whatman No. 17 papers. The yellow fluorescing band was eluted with 0.1 N hydrochloric acid and neutralised with sodium bicarbonate giving 2,10-dihydro-4-hydroxy - 10-2'-hydroxyethyl - 2 - imino-7,8-dimethylbenzo[g]pteridine (25 mg.), M.P. above 320° C. Ultraviolet absorption maxima: 267 m$\mu$ ($\epsilon$=24050), 385 m$\mu$ ($\epsilon$=11200) and 442 m$\mu$ ($\epsilon$=14000) at pH 1. [Found: C, 58.6; H, 5.4; N, 24.9%. $C_{14}H_{15}N_5O_2$ requires: C, 58.95; H, 5.3; N, 24.6%.]

2-iminoriboflavin (100 mg.) was treated with a solution of sodium metaperiodate (180 mg.) in water (30 ml.) and stirred in the dark overnight. The resulting reddish brown solid was collected and washed with water, with a little methanol, and with ether. The solid (70 mg.) was treated with a solution of sodium borohydride (30 mg.) in water (30 ml.) and stirred for 30 minutes. The mixture, on standing overnight at room temperature, deposited a reddish brown solid which was dissolved in 0.1 N hydrochloric acid (10 ml.), treated with charcoal, and filtered hot. The filtrate was carefully adjusted to pH 7 by addition of solid sodium bicarbonate and refrigenated to give 2,10-dihydro-4-hydroxy-10-2'-hydroxyethyl-2-imino ₋ 7,8 - dimethylbenzo[g]pteridine as yellow-brown crystals (56 mg.; 83%). This product was identical in all respects with that obtained in the preceding paragraph.

*Synthesis of 4-amino-2,10-dihydro-2-imino-7,8,10-trimethylbenzo[g]pteridine*

4-amino-2,8-dihydro-2-imino - 6,7,8-trimethylpteridine, prepared by ring closure from 2,5,6-triamino-4-methylaminopyrimidine and butane-2,3-dione, was heated under reflux in pH 7.3 buffer and the desired product isolated in the manner previously described.

What we claim is:

1. A process for the synthesis of compounds of the formula:

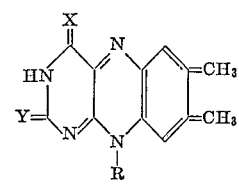

which comprises heating at a temperature of from 60 to 150° C. a neutral aqueous solution of a compound of the formula:

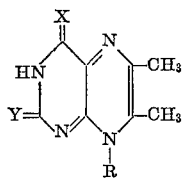

where in the above formulae X and Y are individually selected from the class consisting of oxygen, sulphur, imino, alkylamino, aralkylimino and arylimino, and R is selected from the class consisting of the alkyl, mono- and polyhydroxyalkyl groups, arylalkyl groups and aryl groups having from 1 to 8 carbon atoms.

2. A process claimed in claim 1 wherein the heating is carried out under reflux and under an inert atmosphere.

3. A process for the synthesis of riboflavin which comprises heating under reflux and under an inert atmosphere a neutral aqueous solution of 6,7-dimethyl-8-D-ribityl-lumazine.

4. 2,10-dihydro-4-hydroxy-10-2' - hydroxyethyl - 2 - imino-7,8-dimethylbenzo[g]pteridine.

References Cited by the Examiner
UNITED STATES PATENTS 2,847,413  8/58  Folkers et al. _____ 260—251.5
2,867,614  1/59  Bardos et al. _____ 260—211.3

OTHER REFERENCES

Plaut: Chem. Abst., vol. 54, 1960, pp. 24, 946(b).

LEWIS GOTTS, *Primary Examiner.*